United States Patent [19]

Rice et al.

[11] 4,097,294

[45] Jun. 27, 1978

[54] PREPARATION OF CERAMICS

[75] Inventors: Roy W. Rice, Alexandria; Kenneth J. Wynne, Falls Church; William B. Fox, Alexandria, all of Va.

[73] Assignee: The United States of America as represented by the Secretary of the Navy, Washington, D.C.

[21] Appl. No.: 716,729

[22] Filed: Aug. 23, 1976

[51] Int. Cl.$^2$ .................... C04B 35/56; C04B 35/58
[52] U.S. Cl. .................... 106/43; 106/44; 106/55; 106/69; 106/73.5; 264/65
[58] Field of Search ............. 106/43, 44, 55, 73.5; 264/65; 423/291, 344, 345; 260/448.2 N

[56] References Cited

U.S. PATENT DOCUMENTS

| 3,457,222 | 7/1969 | Papetti | 260/448.2 N |
| 3,457,223 | 7/1969 | Papetti | 260/448.2 N |
| 3,463,801 | 8/1969 | Papetti et al. | 260/448.2 N |
| 3,821,070 | 6/1974 | Mansmann et al. | 264/65 |
| 3,853,567 | 12/1974 | Verbeek | 106/55 |
| 3,892,583 | 7/1975 | Winter et al. | 106/55 |
| 4,010,233 | 3/1977 | Winter et al. | 264/65 |

FOREIGN PATENT DOCUMENTS

| 2,236,078 | 3/1974 | Germany | 106/44 |
| 1,295,460 | 5/1969 | Germany | 106/55 |

OTHER PUBLICATIONS

Yajima, S. et al. —"Continuous SiC Fiber of High Tensile Strength" Chemistry Letters pp. 931–934, (1975), Pub by Chem. Soc. of Japan.

Yajima, S. et al. —"Structural Analysis in Continuous Silicon Carbide Fiber of High Tensile Strength," Chem. Letters, pp. 1209–1212, (1975).

Yajima, S. et al. —"Synthesis of Continuous SiC Fibers With High Tensile Strength"—J. Am. Cer. Soc. 59, (7-8), Rec'D by PTO Aug. 6, 76, pp. 324–327.

Primary Examiner—Helen M. McCarthy
Attorney, Agent, or Firm—R. S. Sciascia; Philip Schneider; Thomas McDonnell

[57] ABSTRACT

A method for preparing ceramic material from a polymer which comprises selecting a polymer from the class consisting of poly(diorganosilanes), poly(haloorganosilanes), poly(carbosilanes), polysilazanes, polycarbocarboranes, and polyborazines; heating said polymer to a temperature from 700° to 2000° C at a rate of at most 100° C/hr. in an inert atmosphere for at least one hour; and cooling to room temperature at a cooling rate which avoids thermal stresses.

6 Claims, No Drawings

PREPARATION OF CERAMICS

BACKGROUND OF THE INVENTION

This invention relates generally to processing high strength refractory ceramics and in particular to refractory borides, carbides, and nitrides.

A commonly used technique for fabricating products from ceramics such as $B_4C$, SiC, $Si_3N_4$, or BN is by hot pressing the powder of these materials. Temperatures required are typically in the 1500° to 2400° C range with pressures of a few thousand PSI for times of the order of an hour or more. Some of the most important of these materials namely BN, SiC, and $Si_3N_4$ cannot be sintered, and can only be hot pressed with the use of additives to allow the powders to coalesce into a dense body. These additives, while producing bodies useful for a number of applications generally compromise many desired properties.

In any event the result of hot pressing is a simply shaped billet (i.e. block, disk, or plate) which must then be machined to the necessary shape. Because most of these materials are extremely hard this requires expensive diamond machining which results in high machining costs, e.g. 50 to 95% of the finished ceramic part cost.

Another technique is chemical vapor deposition. Unfortunately this process is quite expensive and has not been adequately developed for any of these materials except BN.

All of these materials have substantial usage and very extensive future potential usage because of their unique hardness, thermal conductivity, optical and electrical properties, and strengths. The high hardness of $Si_3N_4$, some of the phosphides and borides, SiC and $B_4C$, roughly in order of increasing hardness, makes them of interest for present use for ceramic armor, (e.g. for personnel on foot, in helicopters, and in patrol craft, e.g. in 1960 the production of hot pressed $B_4C$ for armor purposes reached approximately 150 tons). Such armor often has to have more complex shapes, for example, contoured breast plates, helmets, and helicopter seats. The high hardness also makes a number of these materials, in particular, $Si_3N_4$ and $B_4C$ and possibly SiC, of interest as special bearing materials. In fact, $B_4C$ is presently used in certain gyro systems and $Si_3N_4$ is under extensive investigation for both rolling, sliding, and air bearing applications. The high hardness of these materials also makes them useful for various machining operations. SiC and $B_4C$ are of course extensively used in machining today. Improving the strength of the bond between these materials could improve such application. Additionally, of particular interest are machining tool inserts for the machining of metals where high hardness, strength, toughness, and oxidation resistance are needed. The latter must come from either intrinsic oxidation behavior of the material or appropriately introduced additives.

The second major mechanical property of interest for these materials is their high elastic modulus, especially that of SiC and $B_4C$. This combined with their low density gives them some of the highest possible moduli of any known materials and hence makes them of considerable interest for special high modulus reinforcing fibers.

The third aspect of their mechanical behavior of interest is their potential strength. The theoretical strength of materials is typically estimated to be approximately 1/10th of their elastic moduli, which for most of these materials is in the range of 40 to 70 million PSI. Presently realized strengths are only in the range of 50 to 150 thousand PSI at room temperature. The refractory character and in particular the oxidation resistance of some of these materials, e.g. $Si_3N_4$ and SiC makes them of interest for high temperature oxidizing application. Specifically, these two materials are being extensively investigated for advanced turbine blade applications.

A major need in the mechanical property area for all of these materials is to improve their toughness especially against impact from both large and small objects. Improvement in high temperature strengths and fracture resistance are also important. Both of these goals can be achieved by appropriate control of microstructure, often in a similar fashion. Thus, for example, both toughness and high temperature crack resistance can often be improved by developing composites, in which appropriately selected dispersed second phases of particulates or often preferably of fibers are introduced throughout the body. Suitable fibers are generally not available and if they were the typical problems of processing a fiber reinforced body of these materials would exist. Particulate compositions are limited by the size of powder particles we can make and techniques for adequately mixing these as well as the associated problems of fabricating bodies of different chemical compositions, each of which is difficult to fabricate in its own right.

High impact resistance can often be obtained not only by increasing the toughness but by producing an integral porous layer on the surface which will crush under impact load. This layer generally should be produced as a contiguous part of the bulk substrate materials rather than added on to it, so that machining and other type of damage does not exist at the interface between the two materials. It is also very desirable to have a continuously graded structure from the substrate to the surface.

SUMMARY OF THE INVENTION

It is therefore an object of this invention is to provide an efficient method for the production of refractory ceramics.

Another object of this invention is to provide a method for increasing the quality of refractory ceramics.

And another object of this invention is to provide a method which imparts the appropriate microstructure for high strength, toughness, and impact resistance.

These and other objects of this invention are achieved by a method which comprises: selecting one or a mixture of polymers selected from the class consisting of poly(diorganosilanes), poly(haloorganosilanes), poly(carbosilanes), polysilazanes, polycarbocarboranes and polyborazines; heating said polymer to a temperature from 700° to 2000° C at a heating rate not exceeding 100° C/hr., so that the crosslinking of the polymer proceeds at a faster rate than the rate at which the permanent reversion of the polymer is proceeding; maintaining the polymer at this temperature for at least one hour, thereby producing a ceramic; and cooling the resulting ceramic to room temperature.

DETAILED DESCRIPTION OF THE INVENTION

A polymer upon pyrolysis reverts to smaller units through the mechanism of breaking of the bonds between the atoms in the polymer backbone. It is theorized that a crosslinking of the polymer prevents a reversion of the polymer. The crosslinking mechanism is favored in relation to the reversion mechanism either by easily cleaved side chains on the backbone or an interruptor atom or group in the backbone or both.

The above is only a possible explanation and is not meant to bind the present invention to any explanation. Although the exact mechanism is not fully understood, it is evident that exceptional ceramic materials are attainable with the method of this invention.

On the basis of experimentation and established principles of chemistry, a number of polymers have been identified which produce ceramic materials under proper processing conditions. A silicon carbide ceramic is obtainable from one or a mixture of the following polymers: (1) a poly(diorganosilane) of the general formula: $(R_2Si)_x$, (2) a poly(haloorganosilane) of the general formula: $(RXSi)_x$, and (3) a poly(carbosilane) of the general formula: $(R_2SiCR_2)_x$, wherein $x$ is greater than 4, R is an alkane, alkene, alkyne, aryl, or alkylaryl group having from 1 to 10 carbon atoms or a halogenated derivative thereof, X is a halogen, and $n$ is an integer from 1 to 10. A silicon nitride ceramic is obtainable from silazane polymers with a repeating unit of $[R_2SiNR]_y$ or $[R_2SiNANSiR]_y$ or

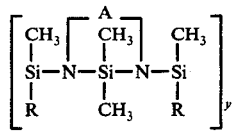

wherein R is defined as previously, $y$ is greater than 2, and A is an alkylene having from 1 to 5 carbon atoms. In a similar manner, a boron carbide ceramic is obtainable from a carborane carbon polymer with a repeating unit of $[R'(C_2B_{10}H_{10}C)]_z$, wherein $z$ is greater than 1 and R' is a bifunctional organic moiety of the general formula $C_nh_{n+2}$ in which $n$ is an integer from 1 to 10 and R is defined as previously. A boron nitride ceramic is obtainable from a borazene polymer of the general formula: $(RBNR)_z$ wherein R and $z$ are defined as previously. A mixed ternary ceramic is obtained from a polymer with a repeating unit of the general formula: $[C_2B_{10}H_{10}R_2Si(R_2SiO)_n]_x$, wherein $n$ is an integer from 1 to 10, $x$ is greater than 4 and R is defined as previously. An excellent value for $x$ is 50.

The final ceramic product may be a bulk material in any shape or a fiber. In either case the basic processing is the same. The polymer is heated to a pyrolyzing temperature from 700° to 2000° C, with a preferred temperature dependent upon the final application. A higher temperature is preferred if a final outgassing of the molten ceramic material is needed. For example, such final outgassing is required for maximum strength ceramics and ceramics used as insulators in vacuum systems. The rate of heating is critical to the operability of the process. The rate should not exceed 100° C/hr. and preferably is from 5° to 40° C, although a heating rate as high as 200° C/hr. may be used for some of this polymer if the thickness of the final product does not exceed ½ of a millimeter.

It is necessary that the heating atmosphere is inert to the polymer and the resulting ceramic. Consequently, the atmosphere must be a vacuum, argon, or the like, but preferably the atmosphere is argon. If a nitride ceramic is being prepared, nitrogen may be used and if a carbide ceramic is being prepared then methane may be used. Air may also be used. Experimentation has shown that the amount of contamination resulting from the use of air is tolerable for most applications where pyrolysis temperature does not exceed 1000° C. The atmosphere may also be pressurized to as much as 100 atmospheres.

Generally a heating time of at least 1 hour is required, but the actual shape and size of the final product may require a different minimum heating time. After the heating has been completed the ceramic is cooled at a rate which avoids detrimental thermal shock. This rate depends on the shape and size of the final product and to a certain extent on the material. Boron carbide is the most susceptible and silicon nitride and boron nitride are the least susceptible to thermal shock.

To better demonstrate the practice of this invention, the processing of two of the most promising polymers is herein given. A quantity of poly(methyl ethyl silane) with an average molecular weight of 5000 is heated to 1500° C at a rate of 25° C/hr. in an atmosphere of argon. The heating is continued for 2 hours, whereupon the material is cooled to room temperature at a rate of 100° C/hr. A quantity of a polymer with the formula $H(CB_{10}H_{10}CC_2H_4)H$ with an average molecular weight of 5,000 to 10,000 is heated to 1200° C at a heating rate of 100° C/hr. in an atmosphere of argon. The heating is continued for 2 hours, whereupon the material is cooled to room temperature at a cooling rate of 100° C/hr.

In order to demonstrate the effectiveness of the present method in the preparation of a ceramic from a polymer, several samples of $[C_2B_{10}H_{10}Si(CH_3)_2\text{-O-}Si(CH_3)_2\text{-O-}Si(CH_3)_2]_x$ and

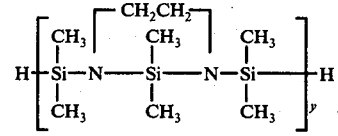

with a molecular weight of approximately 8000 were prepared and tested at different processing conditions. The alkalenetrisilazane polymer was prepared according to the method disclosed in Breed et al *Preparation and Polymerization of 1,5-Diamino-2,4-alkylenetrisilazenes* in J. Pol. Sci: Part A, vol. 2, pp. 45–55, 1964. Tables I and II summarize the processing conditions and test results.

Table I

Test Results for $[C_2B_{10}H_{10}Si(CH_3)_2\text{-O-}Si(CH_3)_2]_x$

Table I

| Sample No. | Atm. | Max. Temp. °C | Heating Rate °C/hr. | % Recovery aft. Pyro. | Hardness kg/mm² | Density gm/c.c |
|---|---|---|---|---|---|---|
| 1 | Air | 1000 | 200 | 68* | | |
| 2 | Air | 700 | 700 | 70* | | |
| 3 | Vac | 750 | 30 | 41 | 1000–1100 | 1.3–1.6 |
| 4 | Vac | 950 | 20 | 25 | 1500–1600 | 1.3–1.6 |

Table I-continued

| Sample No. | Atm. | Max. Temp. °C | Heating Rate °C/hr. | % Recovery aft. Pyro. | Hardness kg/mm$^2$ | Density gm/c.c |
|---|---|---|---|---|---|---|
| 5 | Argon | 950 | 35 | 60 | 1000–1300 | 1.3–1.6 |
| 6 | Argon | 880 | 5 | 52 | 1000–1500 | 1.3–1.6 |

*part of weight gain is on account of oxidation

Table II

Test results for

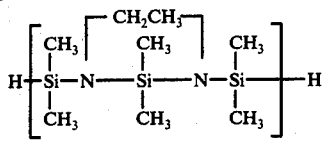

| Sample No. | Atm. | Max. Temp. °C | Heating Rate °C/Hr. | % Recovery aft. Pyro. | Hardness kg/mm$^2$ |
|---|---|---|---|---|---|
| 1 | Air | 950 | 200 | 43* | |
| 2 | Argon | 880 | 30 | 12 | 900–1100 |
| 3 | Vac | 830 | 100 | 5 | |

*part of weight gain is on account of oxidation

Two of the significant points to note from these test results are the effect of air and the heating rate on the final product. Air does cause an inclusion of oxides in the final product and a heating rate of 100° C/hr. or greater seriously diminishes the yield.

An important property of ceramics is oxidation resistance. Table III provides a comparison of the oxidation resistance of two ceramic samples prepared by the method of this invention.

Table III

Oxidation Resistance Comparison

| Sample | % wt. loss at 800° C | 1000° C | 1200° C | 1400° C |
|---|---|---|---|---|
| Sample No. 6 of Table I | 0 | 0 | −4 | −21 |
| SiC powder | — | 0 | +4 | — |
| SiC solid | — | −2 | −2 | — |
| B$_4$C powder | — | +67 | +37 | — |
| B$_4$C solid | — | −1 | −15 | — |
| B$_4$C—SiC powder mixture | — | +48 | +10 | — |
| Sample No. 2 of Table II | — | −2 | −2 | −3 |
| SiC—Si$_3$N$_4$ powder mixture | — | 0 | +6 | — |

Preparing ceramics by the method of this invention provides additional alternatives beside the preparation of producing monolithic ceramics. First is the possibility of producing composites. Both particulate and interconnected phase composites should be feasible by mixing different basic polymeric materials, i.e. one polymer capable of producing Si$_3$N$_4$ and another capable of producing SiC. Processing these in the polymeric or prepolymeric stage could produce extremely fine dispersions based on, for example, crosslinking different polymers, mixing of polymers, or emulsifying operations. Potentially more promising are those based on immiscibility, wherein very homogeneous fine dispersions of spherical particulates or two or more totally interconnected phases would be feasible. Also as noted below fibers could be introduced into bodies for simultaneous pyrolysis. Graded porous structures should be feasible by mixing normal organic based polymers with these special ceramic producing polymers. Again, emulsifying or more appropriately immiscibility phenomena could produce very homogenous and controlled distributions. By removing the normal organic based polymer from such a composite polymer e.g. by solvents prior to pyrolysis, or by oxidation during or after pyrolysis, one can develop the desired porous structures. Finally, both fibers as well as thin sheets can be produced by extrusion and related processes for reinforcing bodies. As noted above these can be incorporated in other precursor polymeric materials in the unpyrolyzed stage, or joint pyrolysis in analogy with the glassy carbon-graphite composites. It should also be noted that by linking various groups on polymers or mixing polymers or additives, doping for special optical or particularly electronic application (e.g. of SiC) might be accomplished.

In summary the method of this invention is a fundamental departure from the whole approach of fabricating many of these vitally important refractory materials. It greatly enhances the versatility in shape that can be produced while greatly reducing the costs of producing these shapes especially in quality materials. The reduction in costs results from the reduction in machining and in the energy for processing. Also by reducing or minimizing machining mechanical strengths can be substantially improved. Further unique microstructural control should allow large improvements in strength, toughness, impact resistance, and creep resistance in these materials. This combined with the absence of additives for their formation should provide unique mechanical properties both at room and elevated temperatures. Finally unique optical and electrical properties might also be achieved by appropriate use of additions that can be incorporated on a much more homogeneous scale by such processing of these materials.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for preparing a ceramic which comprises:
   heating a polymer of the general formula: [C$_2$B$_{10}$H$_{10}$R$_2$Si(R$_2$SiO)$_n$]$_x$ wherein R is selected from the class consisting of alkane, alkene, alkyne, aryl, alkylaryl groups having from 1 to 10 carbon atoms and halogenated derivatives thereof, $n$ is an integer from 1 to 10, and $x$ is greater than 4, to a temperature from 700° to 2000° C with a heating rate not exceeding 100° C/hr. in an inert atmosphere;
   maintaining said polymer at said temperature for at least 1 hour; whereby said polymer converts to a ceramic, and
   cooling said resulting ceramic to room temperature.

2. The method of claim 1 wherein R is selected from the group consisting of alkane or aryl groups.

3. The method of claim 2 wherein $x$ is 50.

4. The method of claim 2 wherein said polymer is $[C_2B_{10}H_{10}Si(CH_3)_2((CH_3)_2SiO)_n]_x$.

5. The method of claim 4 wherein said polymer is $[C_2B_{10}H_{10}Si(CH_3)_2((CH_3)_2SiO)_2]_x$ with a molecular weight of approximately 8000.

6. The method of claim 1 wherein said heating rate is from 5° to 40° C/hr.

* * * * *